(12) United States Patent
S. et al.

(10) Patent No.: US 12,067,788 B2
(45) Date of Patent: Aug. 20, 2024

(54) METHOD AND SYSTEM FOR DETECTING AND CLASSIFYING LANES

(71) Applicant: HL Klemove Corp., Pyeongtaek (KR)

(72) Inventors: Vinuchackravarthy S., Bangalore (IN); Shubham Jain, Bangalore (IN)

(73) Assignee: HL KLEMOVE CORP., Incheon (KR)

(*) Notice: Subject to any disclaimer, the term of this patent is extended or adjusted under 35 U.S.C. 154(b) by 516 days.

(21) Appl. No.: 17/530,524

(22) Filed: Nov. 19, 2021

(65) Prior Publication Data

US 2022/0165072 A1    May 26, 2022

(30) Foreign Application Priority Data

Nov. 20, 2020 (IN) .............. 202041050636

(51) Int. Cl.
| | | |
|---|---|---|
| *B60W 50/14* | (2020.01) | |
| *B60W 30/12* | (2020.01) | |
| *B60W 30/18* | (2012.01) | |
| *G06N 3/08* | (2023.01) | |
| *G06V 10/26* | (2022.01) | |
| *G06V 10/764* | (2022.01) | |
| *G06V 10/82* | (2022.01) | |

(Continued)

(52) U.S. Cl.
CPC .......... *G06V 20/588* (2022.01); *B60W 30/12* (2013.01); *B60W 30/18163* (2013.01); *B60W 50/14* (2013.01); *G06N 3/08* (2013.01); *G06V 10/26* (2022.01); *G06V 10/764* (2022.01); *G06V 10/82* (2022.01); *B60W 2420/403* (2013.01)

(58) Field of Classification Search
CPC .... G06V 20/588; G06V 10/26; G06V 10/764; G06V 10/82; G06V 30/19173; B60W 30/12; B60W 30/18163; B60W 50/14; B60W 2420/403; G06N 3/08; G06N 3/045; G06N 3/04

See application file for complete search history.

(56) References Cited

U.S. PATENT DOCUMENTS

| | | |
|---|---|---|
| 10,423,840 B1 | 9/2019 | Kim |
| 2019/0095722 A1 | 3/2019 | Kang |
| 2019/0156485 A1* | 5/2019 | Pfeiffer ................ G05D 1/0253 |

(Continued)

OTHER PUBLICATIONS

In-Lane Localization and Ego-Lane Identification Method Based on Highway Lane Endpoints.

*Primary Examiner* — Rodney A Butler
(74) *Attorney, Agent, or Firm* — Harvest IP Law, LLP

(57) ABSTRACT

The present disclosure is related in general to field of machine learning and image processing, that provides a method and system for detecting and classifying lanes. A lane detection and classification system receives an input image from a data source and segments the input image into plurality of segments using a trained semantic segmentation model. Further, one or more lane markings are detected in the segmented image and, lane pattern and lane colour of each of the one or more lane markings, wherein each lane marking is associated with a priority. Subsequently, a binary image comprising lane markings of ego lanes of the host vehicle is generated and coefficient values of the ego lanes of the host vehicle are determined based on the priority value associated with the lane markings of the ego lanes and current position of the host vehicle, using a trained Convolutional Neural Network (CNN) model.

18 Claims, 9 Drawing Sheets

(51) Int. Cl.
*G06V 20/56* (2022.01)
*G06V 20/58* (2022.01)

(56) References Cited

U.S. PATENT DOCUMENTS

2020/0210696 A1* 7/2020 Hou .................... G06V 10/242
2020/0285869 A1* 9/2020 Mansour ................ G06N 5/046

* cited by examiner

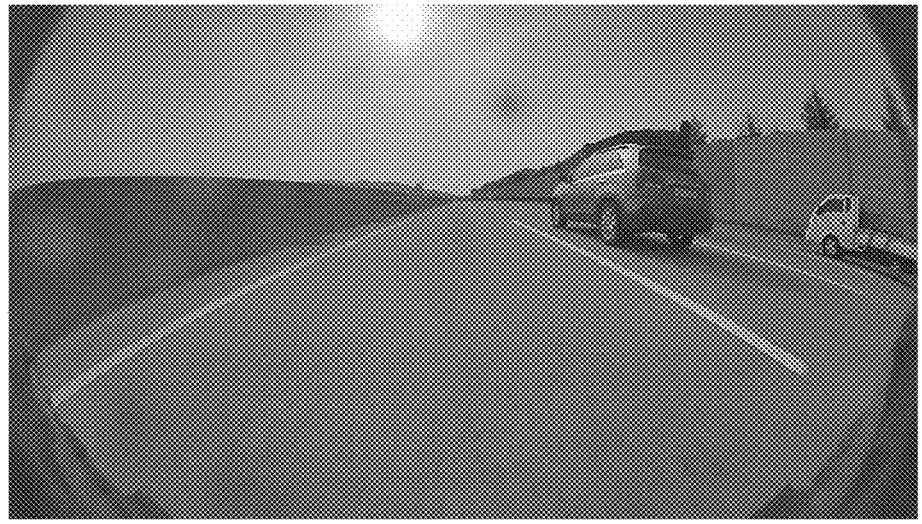
FIG.2B (1)
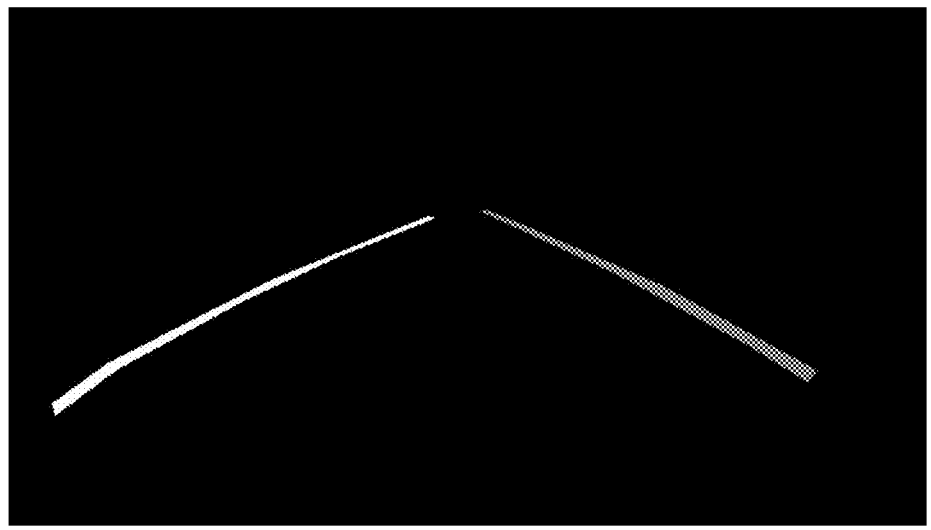
FIG.2B (2)

FIG.2C (1)
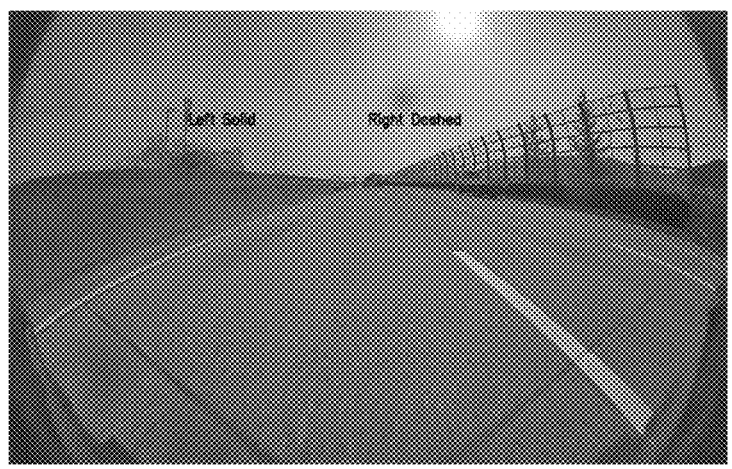
FIG.2C (2)
FIG.2C (3)

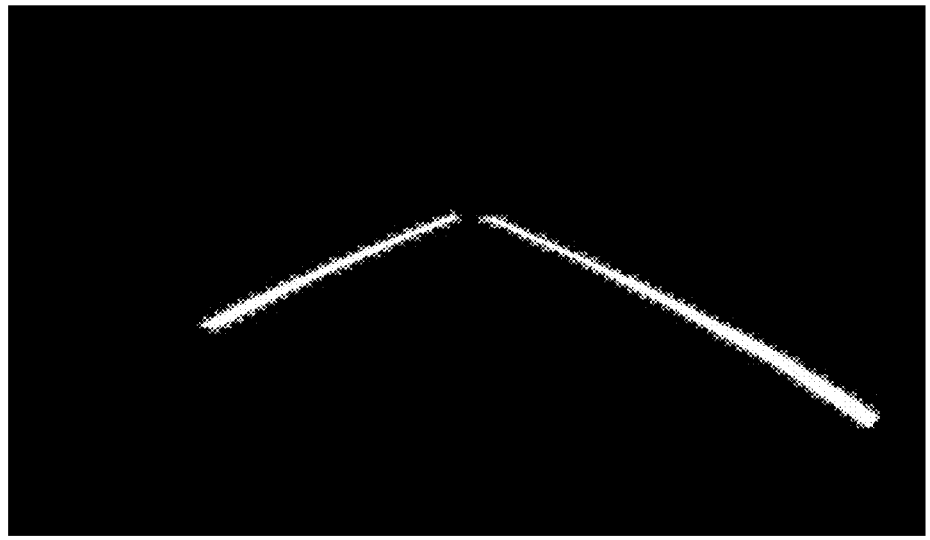
FIG.2D (1)
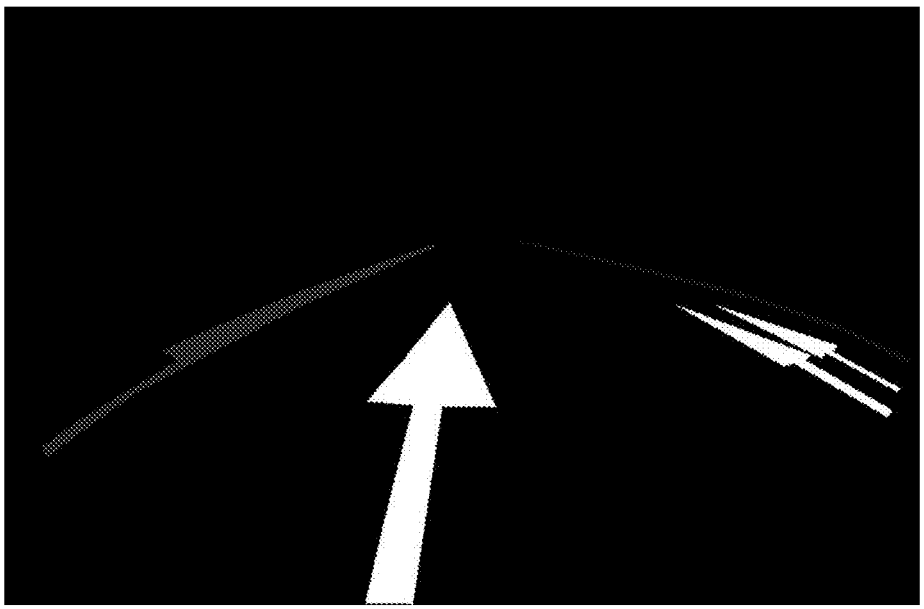
FIG.2D (2)

METHOD AND SYSTEM FOR DETECTING AND CLASSIFYING LANES

CROSS-REFERENCE TO RELATED APPLICATION

This application claims priority from India Patent Application No. 202041050636, filed on Nov. 20, 2020 in the Intellectual Property India, the disclosure of which is incorporated herein by reference in its entirety.

TECHNICAL FIELD

The present subject matter is related in general to the field of machine learning and image processing, and more particularly, but not exclusively to a method and a system for detecting and classifying lanes.

BACKGROUND

Nowadays, automotive industries have started to move towards autonomous vehicles. Autonomous vehicles are the vehicles that are capable of sensing environment around them for moving on road without any human intervention. The autonomous vehicles sense the environment with the help of sensors configured in the autonomous vehicles such as Laser, Light Detection and Ranging (LIDAR), Global Positioning System (GPS), computer vision and the like. The autonomous vehicles highly rely on lane detection on the road for navigating smoothly.

Nowadays, in urban areas, there are various types of markings on the road that assist a user or autonomous vehicles while driving. As an example, the various types of markings may be lane directions, cross walks, stop lines, arrow marks and the like. For effective and safe navigation of the autonomous vehicle, it is important to detect and classify the markings on the road. Further, it is also important to continuously determine position of the ego lanes, with respect to the vehicle, Currently, the existing techniques provide a method of determine co-efficient values of lanes on the road using deep learning models. Further, there are other existing techniques that provide a method of classifying markings on the road using deep learning models. Since, the currently existing techniques perform the co-efficient computation and classification of road markings independently in different systems using different deep learning models, the existing techniques are unable to generate accurate warning signals for the vehicle. As an example, consider the existing system that performs co-efficient computation. By performing the co-efficient computation, existing system would be aware of only the aspects such as curvature of the lane, slope of the lane and offset of the lane from the vehicle. However, this system is completely unaware of the class of lanes, due to which the system fails to provide accurate warning signals with respect to real-time decisions taken by the vehicle or driver of the vehicle. Similarly, in the other scenario, the system may be aware of the class of lanes but would not have any information on co-efficient values corresponding to the lanes, thus failing to provide accurate warning signals to the vehicle or the driver of the vehicle. In another scenario, since the existing systems that performs co-efficient computation does not deal with detection and classification of markings on the road, such system may give rise to pseudo computation scenarios i.e. these systems may determine the co-efficient values for an input image even when there are no lanes present in the input image, due to false detections. Therefore, such pseudo computation not only provides wrong/inaccurate warning signals to the vehicle or the driver of the vehicle, but also leads to unnecessary processing and wastage of time and resources. Therefore, the existing techniques may require minimum two fully developed deep learning models for co-efficient computation and classification of lanes, which is not only complex but also expensive.

Hence, there is need for a deep learning based technique that performs both lane detection and classification with less complexity and better accuracy.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein is a method of detecting and classifying lanes. The method includes receiving, by a processor communicatively connected to an image sensor mounted to a host vehicle, an input image from a data source. The input image is an RGB image captured by the image sensor. Upon receiving the input image, the method includes segmenting the input image into plurality of segments using a trained semantic segmentation model. Further, the method includes detecting one or more lane markings in the segmented image and, lane pattern and lane colour of each of the one or more lane markings. Each of the one or more lane markings is associated with a priority value based on the corresponding lane pattern and lane colour. Subsequently, the method includes generating a binary image comprising lane markings of ego lanes of the host vehicle. The lane markings of ego lanes are extracted from the one or more lane markings detected in the segmented image. Finally, the method includes determining coefficient values of the ego lanes of the host vehicle based on the priority value associated with the lane markings of the ego lanes and current position of the host vehicle, using a trained Convolutional Neural Network (CNN) model. Further, the present disclosure comprises lane detection and classification system for detecting and classifying lane patterns. The lane detection and classification system comprises an image sensor mounted to a host vehicle, to capture images of an area in front of the host vehicle. Further, the lane detection and classification system comprises a processor communicatively connected to the image sensor and configured to receive an input image from a data source. The input image is an RGB image captured by the image sensor. Upon receiving the input image, the processor is configured to segment the input image into plurality of segments using a trained semantic segmentation model. Further, the processor is configured to detect one or more lane markings in the segmented image and, lane pattern and lane colour of each of the one or more lane markings. Each of the one or more lane markings is associated with a priority value based on the corresponding lane pattern and lane colour. Subsequently, the processor is configured to generate a binary image comprising lane markings of ego lanes of the host vehicle. The lane markings of ego lanes are extracted from the one or more lane markings detected in the segmented image. Finally, the processor is configured to determine coefficient values of the ego lanes of the host vehicle based on the priority value associated with the lane markings of the ego lanes and current position of the host vehicle, using a trained Convolutional Neural Network (CNN) model.

Furthermore, the present disclosure comprises an Advanced Driver-Assistance System (ADAS) comprising a lane detection and classification system, a warning generating system and a vehicle controlling system. The lane detection and classification system includes an image sensor mounted to a host vehicle, to capture images of an area in front of the host vehicle. Further, the lane detection and classification system includes a processor communicatively connected to the image sensor and configured to receive an input image from a data source. The input image is an RGB image captured by the image sensor. Further, the processor segments the input image into plurality of segments using a trained semantic segmentation model. Thereafter, the processor detects one or more lane markings in the segmented image and, lane pattern and lane colour of each of the one or more lane markings. Each of the one or more lane markings is associated with a priority value based on the corresponding lane pattern and lane colour. Subsequently, the processor generates a binary image comprising lane markings of ego lanes of the host vehicle. The lane markings of ego lanes are extracted from the one or more lane markings detected in the segmented image. Further, the processor determines coefficient values of the ego lanes of the host vehicle based on the priority value associated with the lane markings of the ego lanes and current position of the host vehicle, using a trained Convolutional Neural Network (CNN) model. Further, the warning generating system associated with the lane detection and classification system is configured to generate warning signals to the host vehicle based on the coefficient values of the ego lanes of the host vehicle and the lane pattern and the lane colour of each of the one or more lane markings. The vehicle controlling system associated with the warning generating system and the lane detection and classification system is configured to receive warning signals related to the host vehicle from the warning generating system. Finally, the vehicle controlling system controls navigation of the host vehicle, in real-time, based on the received warning signals.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 2B(1) and FIG. 2B(2) shows an exemplary input image and a corresponding Ground Truth (GT) image, respectively, in accordance with some embodiments of the present disclosure;

FIG. 2C(1) shows an exemplary input image indicating a solid lane and a dashed lane overlaid on lane markings in accordance with some embodiments of the present disclosure;

FIG. 2C(2) shows an exemplary input image indicating textual way of representing a lane pattern in accordance with some embodiments of the present disclosure;

FIG. 2C(3) shows an exemplary input image indicating left and right ego lanes overlaid on lane markings in accordance with some embodiments of the present disclosure;

FIG. 2D(1) shows an exemplary binary image indicating only the ego lanes in accordance with some embodiments of the present disclosure;

FIG. 2D(2) shows an exemplary binary image indicating the ego lanes and straight arrows present within the ego lanes in accordance with some embodiments of the present disclosure.

Figure 2A:
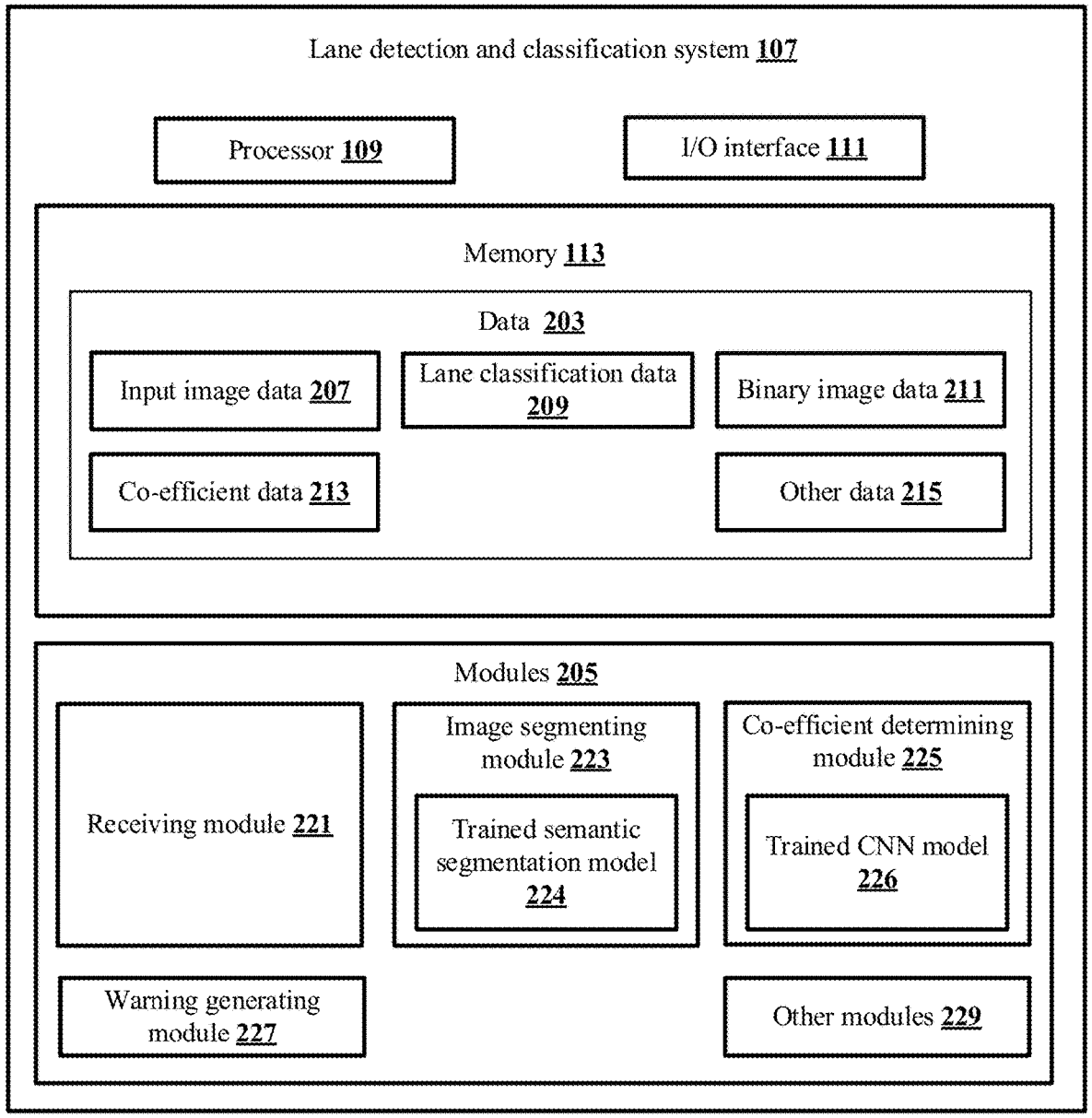
FIG. 2A shows a detailed block diagram of a lane detection and classification system for detecting and classifying lanes in accordance with some embodiments of the present disclosure.
Figure 2E:
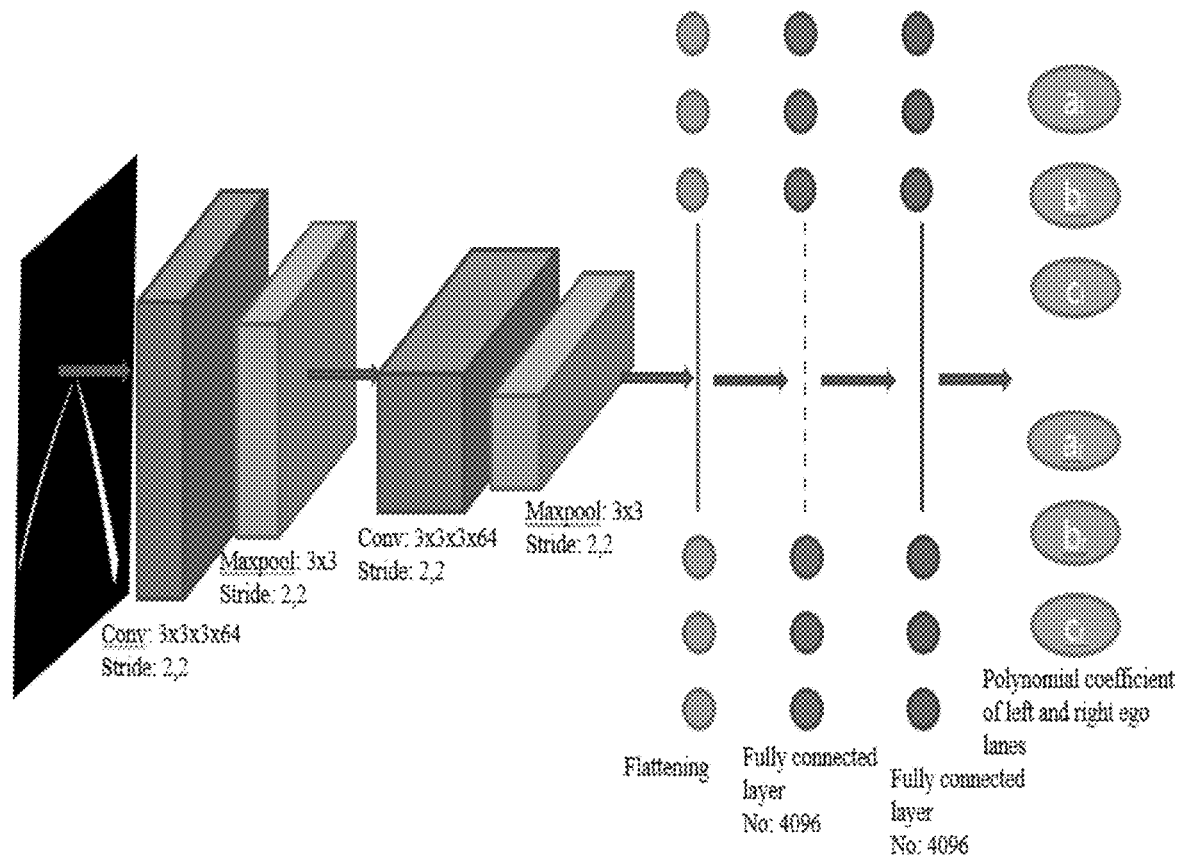
Figure 2F:
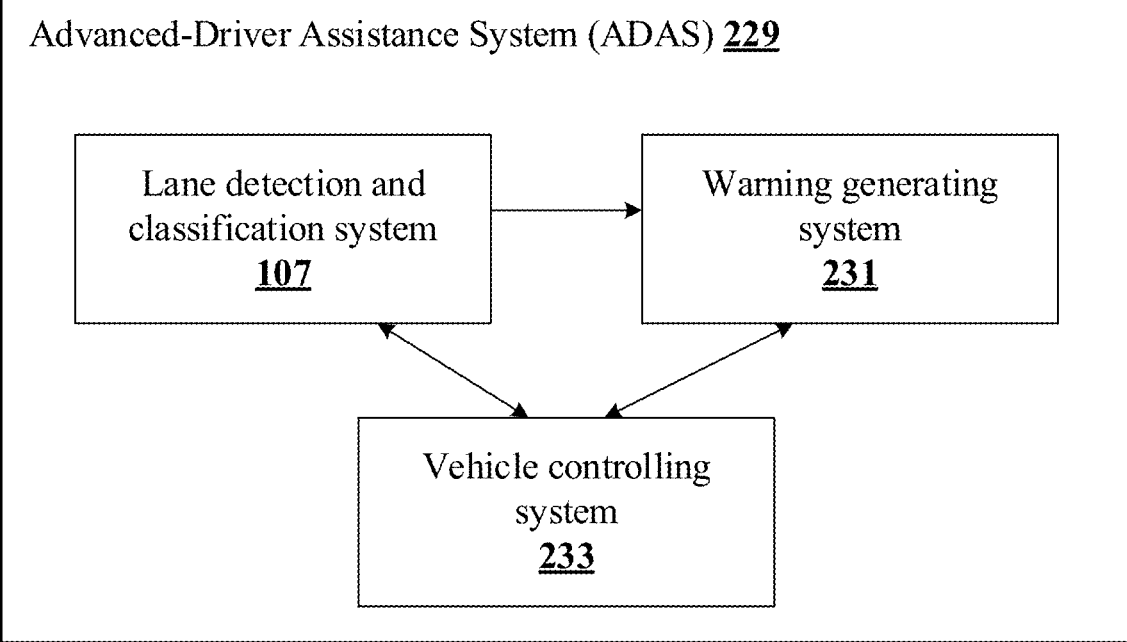
Figure 3:
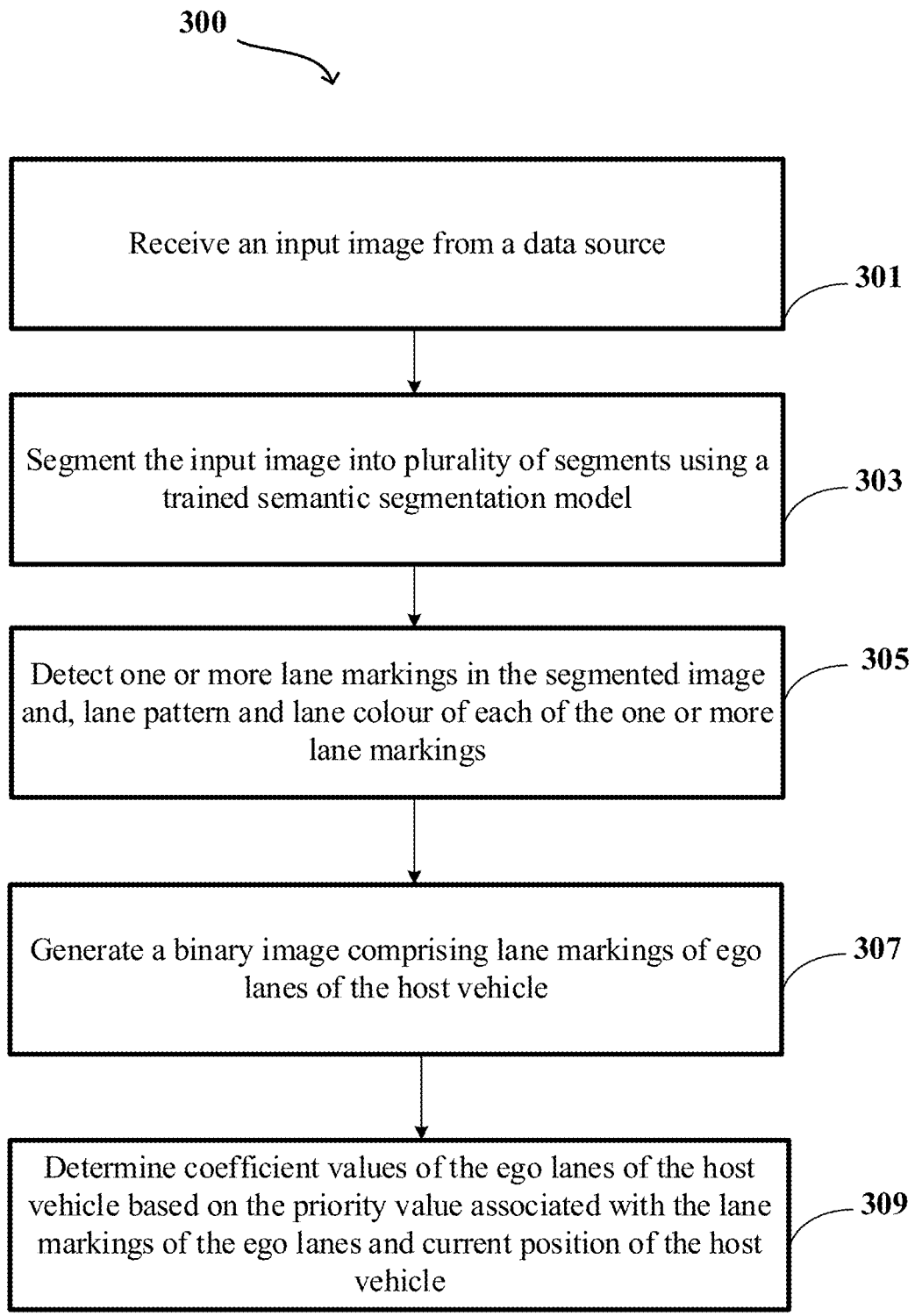
Figure 4:
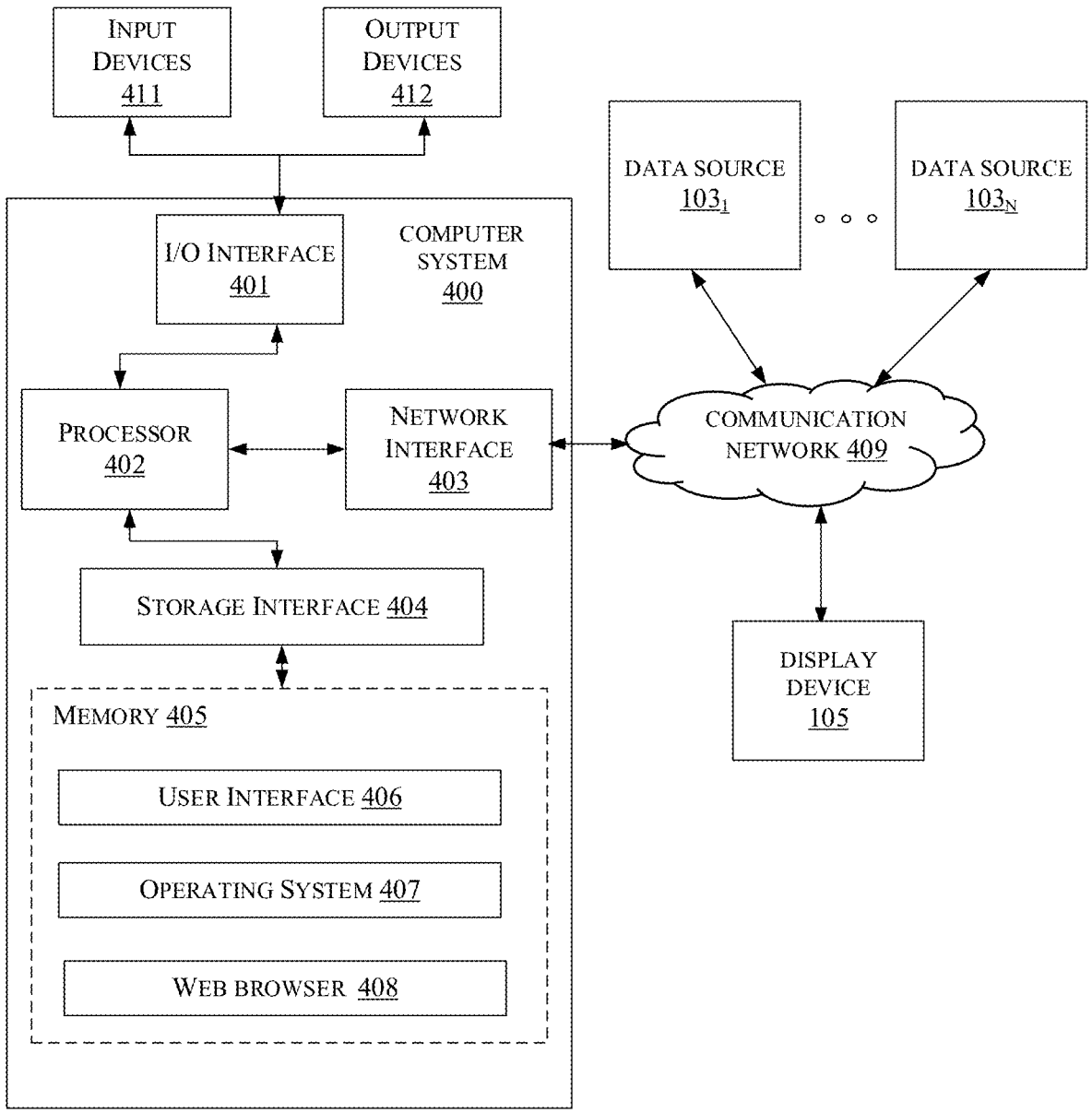

FIG. 2E shows an exemplary trained CNN model in accordance with some embodiments of the present disclosure;

FIG. 2F shows an exemplary Advanced-Driver Assistance System (ADAS) in accordance with some embodiments of the present disclosure;

FIG. 3 shows a flowchart illustrating a method of detecting and classifying lanes in accordance with some embodiments of the present disclosure; and FIG. 4 is a block diagram of an exemplary computer system for implementing embodiments consistent with the present disclosure.

It should be appreciated by those skilled in the art that any block diagram herein represent conceptual views of illustrative systems embodying the principles of the present subject matter. Similarly, it will be appreciated that any flow chart, flow diagram, state transition diagram, pseudo code, and the like represent various processes which may be substantially represented in computer readable medium and executed by a computer or a processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure provides a method, system and a non-transitory computer readable medium for detecting and classifying lanes. A lane detection and classification system receives an input image from a data source. In some embodiments, the input image may be an RGB image captured by an image sensor mounted to a host vehicle. Upon receiving the input image, the lane detection and classification system may segment the input image into plurality of segments using a trained semantic segmentation model. In some embodiments, the lane detection and classification system may perform upscaling and downscaling operations on the input image, during segmentation, using the trained semantic segmentation model. Further, the lane detection and classification system may detect one or more lane markings in the segmented image and, lane pattern and lane colour of each of the one or more lane markings. In some embodiments, each of the one or more lane markings is associated with a priority value based on the corresponding lane pattern and lane colour. Subsequently, the lane detection and classification system may generate a binary image comprising lane markings of ego lanes of the host vehicle. In some embodiments, the lane markings of ego lanes are extracted from the one or more lane markings detected in the segmented image. Further, the lane detection and classification system may determine coefficient values of the ego lanes of the host vehicle based on the priority value associated with the lane markings of the ego lanes and current position of the host vehicle, using a trained Convolutional Neural Network (CNN) model. In some embodiments, the coefficient values of the ego lanes may indicate offset of the ego lanes from the current position of the host vehicle, slope of the ego lanes and curvature of the ego lanes. The ego lanes may include a left ego lane and a right ego lane. Further, the lane detection and classification system may overlay graphical lanes on the input image based on the coefficient values of the ego lanes and the lane pattern of the ego lanes, to indicate position of the ego lanes in the input image. In some embodiments, the lane detection and classification system may also generate warning signals to the host vehicle based on the coefficient values of the ego lanes of the host vehicle and the lane pattern and lane colour of each of the one or more lane markings.

The present disclosure provides a universal robust deep learning based lane detection and classification system that performs both detection and classification of lanes/markings on the road, and co-efficient computation of the detected and classified lanes. Therefore, the present disclosure is capable of providing highly efficient and accurate results at less computational cost. Further, the present disclosure provides highly accurate warning signals to the host vehicle or driver of the host vehicle, by considering inference of both lane classification and co-efficient computation, along with an additional dimension of priority value assigned to each class of lane. Further, the present disclosure triggers the trained CNN model for performing co-efficient computation, only when the one or more lane markings are detected in the trained semantic segmentation model, thereby eliminating pseudo computation scenarios where co-efficient values would be determined irrespective of presence or absence of lane markings. Further, the trained semantic segmentation model of the present disclosure involves a combination of pointwise convolution, group convolution, residual unit and depth wise convolution unit. Therefore, the present disclosure enables performing convolution with reduced number of parameters, hence increasing the training and inference speed. Further, the present disclosure performs up sampling and down sampling of various layers during segmentation of the input image, which helps in achieving segmentation with accuracy and sharp edges. Further, in a non-limiting embodiment, the image sensor used by the present disclosure is a fish eye camera which would be already mounted to the host vehicles for achieving surround view of the host vehicle. Usage of the fish eye camera for segmentation, eliminates the need for distortion correction and inverse perspective mapping of the input image.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
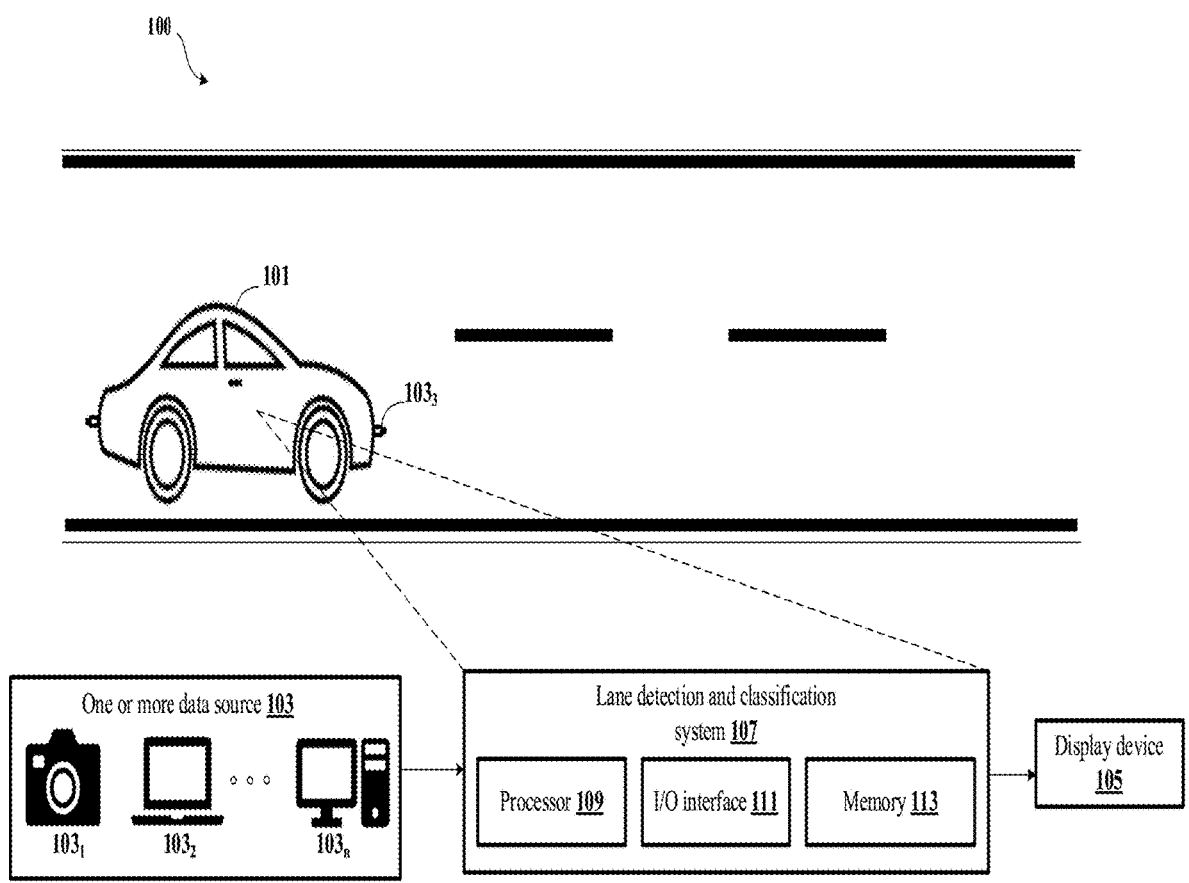
FIG. 1 shows an exemplary architecture for detecting and classifying lanes in accordance with some embodiments of the present disclosure.

FIG. 1 shows an exemplary architecture for detecting and classifying lanes in accordance with some embodiments of the present disclosure.

The architecture 100 comprises a host vehicle 101, data source 103$_1$ to data source 103$_n$ (also referred as one or more data sources 103), a display device 105 and a lane detection and classification system 107. As an example, the host vehicle 101 may be a car, a truck, a bus, and the like. In some embodiments, the one or more data sources 103 may provide input images captured by an image sensor mounted to the host vehicle 101, to the lane detection and classification system 107. As an example, the one or more data sources 103 may include, but not limited to, the image sensors configured on the host vehicle 101, an image repository or a computing device such as a mobile, a desktop, a laptop and the like associated with the image sensors. As an example, the image sensors may include, but not limited to, a camera. In some embodiments, one or more image sensors may be configured at different positions on the host vehicle 101. As an example, the camera used in the present disclosure may be a front looking surround view camera (e.g. a fisheye camera) configured on the host vehicle 101. However, this example should not be construed as a limitation of the present disclosure. In some embodiments, each of the one or more data sources 103 may be associated with the lane detection and classification system 107 via a communication network. In some embodiments, the communication network may be at least one of a wired communication network and a wireless communication network. The lane detection and classification system 107 may be hosted on a server. In some embodiments, the server in which the lane detection and classification system 107 is hosted may be a local server configured in the host vehicle 101 as shown in the FIG. 1. In some other embodiments, the server in which the lane detection and classification system 107 is hosted may be a remote server or a cloud server. Further, in some embodiments, the lane classification system 107 may be implemented as part of Advanced Driver-Assistance Systems (ADAS).

Further, the lane detection and classification system 107 may include a processor 109, an Input/Output (I/O) interface 111, a memory 113 and an image sensor (not shown in FIG.

1). In some embodiments, the processor 109 may refer to an image processor and a microprocessor or a microcontroller performing their respective functionalities as explained below in the present disclosure. The I/O interface 111 may receive an input image from a data source 103 among the one or more data sources 103. In some embodiments, the input image may be an RGB image captured by the image sensor mounted to the host vehicle 101. The input image may include a front view of road and surrounding view visible within the Field of View (FOV) from the host vehicle 101. The input image received through the I/O interface 111 may be stored in the memory 113. In some embodiments, the image processor may directly process image signals of the RGB image received from the image sensor mounted to the host vehicle 101, before storing the RGB image in the memory 113. In some other embodiments, the image processor may process the RGB image, upon receiving the RGB image the data source 103, and then store the processed RGB image in the memory 113. As an example, processing the RGB image may include functionalities such as noise reduction, enhancing resolution, suppressing blurriness and vibrations, and the like. In some embodiments, rest of the actions performed on the input image upon performing the initial image processing, are performed by the microprocessor or the microcontroller, which is a part of the processor 109. Further, the microprocessor communicatively connected to the image sensor may segment the input image into plurality of segments using a trained semantic segmentation model. As an example, the trained semantic segmentation model may be built using shufflenet image classification architecture. In some embodiments, upon segmenting the input image, the trained semantic segmentation model may detect presence of one or more lane markings in the segmented image. Upon detecting the presence of the one or more lane markings, the trained semantic segmentation model may classify the one or more lane markings. In some embodiments, classifying the one or more lane markings may include, but not limited to, detecting lane pattern and lane colour of each of the one or more lane markings. In some embodiments, each of the one or more lane markings may be associated with a priority value based on the corresponding lane pattern and lane colour. The priority value may indicate relative priority of each of the one or more lane markings. Further, the microprocessor may generate a binary image from the input image. In some embodiments, the binary image may include, but not limited to, lane markings of ego lanes of the host vehicle 101 that may be extracted from the one or more lane markings detected in the segmented image. In some embodiments, ego lanes may be the lanes within which the host vehicle 101 is currently navigating. The ego lanes may include a left ego lane and a right ego lane. Further, the microprocessor may determine coefficient values of the ego lanes of the host vehicle 101 based on the priority value associated with the lane markings of the ego lanes and current position of the host vehicle 101, using a trained Convolutional Neural Network (CNN) model. In some embodiments, the trained CNN model may convert the binary image from a two-dimensional form to a one-dimensional form, when determining the coefficient values of the ego lanes of the host vehicle 101. In some embodiments, the coefficient values of the ego lanes indicate offset of the ego lanes from the current position of the host vehicle 101, slope of the ego lanes and curvature of the ego lanes. Further, the microprocessor may overlay graphical lanes on the input image based on the coefficient values of the ego lanes and the lane pattern of the ego lanes, to indicate position of the ego lanes in the input image. In some embodiments, the overlaid graphical lanes on the input image may be displayed on a display device 105 associated with the lane detection and classification system 107. In some embodiments, the display device 105 may be configured in the host vehicle 101. Further, the microprocessor may also generate warning signals to the host vehicle 101 based on the coefficient values of the ego lanes of the host vehicle 101 and the lane pattern and lane colour of each of the one or more lane markings.

FIG. 2A shows a detailed block diagram of a lane detection and classification system for detecting and classifying lanes in accordance with some embodiments of the present disclosure.

In some implementations, the lane detection and classification system 107 may include data 203 and modules 205. As an example, the data 203 may be stored in a memory 113 configured in the lane detection and classification system 107 as shown in the FIG. 2A. In one embodiment, the data 203 may include input image data 207, lane classification data 209, binary image data 211, co-efficient data 213 and other data 215. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 215 may store data, including temporary data and temporary files, generated by the modules 205 for performing the various functions of the lane detection and classification system 107.

In some embodiments, the data 203 stored in the memory 113 may be processed by the modules 205 of the lane detection and classification system 107. The modules 205 may be stored within the memory 113. In an example, the modules 205 communicatively coupled to the processor 109 configured in the lane detection and classification system 107, may also be present outside the memory 113 as shown in FIG. 2A and implemented as hardware. As used herein, the term modules 205 may refer to an application specific integrated circuit (ASIC), a Field-Programmable Gate Array (FPGA), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 221, an image segmenting module 223, a co-efficient determining module 225, a warning generating module 227 and other modules 229. The other modules 229 may be used to perform various miscellaneous functionalities of the lane detection and classification system 107. It will be appreciated that such aforementioned modules 205 may be represented as a single module or a combination of different modules.

In some embodiments, the receiving module 221 may receive an input image from a data source 103 among one or more data sources 103 associated with the lane detection and classification system 107. In some embodiments, the input image may be an RGB image captured by an image sensor configured on a host vehicle 101. The input image thus received from the data source 103 may be stored as the input image data 207.

In some embodiments, the one or more data sources 103 may provide input images captured by an image sensor mounted to the host vehicle 101, to the lane detection and classification system 107. As an example, the one or more data sources 103 may include, but not limited to, the image sensor configured on the host vehicle 101, an image repository or a computing device such as a mobile, a desktop, a laptop and the like associated with the image sensor. As an example, the image sensor may include, but not limited to, a camera. As an example, the camera may be a front looking surround view camera (also referred as fisheye camera) configured on the host vehicle 101, which provides a wider Field of View (FOV).

Further, in some embodiments, the image segmenting module 223 may segment the input image into a plurality of segments, using a trained semantic segmentation model 224. In some embodiments, the trained semantic segmentation model 224 may be built by concatenating an image classification architecture with an upsampling network. As an example, the image classification algorithm architecture may be a shufflenet image classification architecture. The shufflenet image classification architecture mainly comprises a shufflenet unit which is a combination of pointwise convolution, group convolution, residual unit and depthwise convolution unit. The combination of the aforesaid convolution units helps to perform convolution with reduced number of parameters, thereby increasing training speed and inference speed. Further, the upsampling network may upsample various layers of feature hierarchy in the semantic segmentation model using trainable transpose convolution. In some embodiments, combination of various upsampled layers helps the lane detection and classification system 107 to segment lanes with sharp and accurate edges.

In some embodiments, the trained semantic segmentation model 224 may be trained using Ground Truth (GT) images of various trial RGB images. As an example, consider an RGB image as shown in the FIG. 2B(1). The RGB image in the FIG. 2B(1) may be initially converted into a GT image as shown in FIG. 2B(2). In some embodiments, the RGB image may be transformed into a GT image using manual annotations. In some other embodiments, the GT image may be created based on one or more predefined transformation techniques. The GT image comprises labels of roads in black colour and the one or more lane markings (listed in the Table 1 below) in grey colour based on the labels of the roads. The GT image thus obtained may be provided as input to the semantic segmentation model along with the trial RGB image, to train the semantic segmentation model on detection and classification of the one or more lane markings.

Therefore, in real-time, the image segmenting module 223 may initially receive the input image. In some embodiments, the input image may include an entire scene/view captured by the image sensor configured to capture front view from the host vehicle 101. In some embodiments, the image segmenting module 223 may segment the input image in order to extract and filter out necessary portions of the input image which are required for performing accurate lane detection and classification. As an example, the necessary portions of the input image required for performing the lane detection and classification may include, but not limited to, ego lanes of the host vehicle 101 and portion of the input image within the ego lanes of the host vehicle 101. In some embodiments, the image segmenting module 223 may segment the input image into a plurality of segments based on Ground Truth information of the input image, using the trained semantic segmentation model 224. In some embodiments, the Ground Truth information may be information which is collected by direct observation, which helps in relating real features with data captured in the input image. Upon segmenting the input image, the trained semantic segmentation model 224 may detect one or more lane markings present in the segmented image and, lane pattern and lane colour of each of the one or more lane markings thus detected. In some embodiments, the trained semantic segmentation model 224 may also determine co-ordinates of the one or more detected lane markings. In some embodiments, the lane pattern may be at least one of a solid lane and a dotted lane.

Further, in some embodiments, the image segmenting module 223 may provide the detected lane pattern to a display device 105 associated with the lane detection and classification system 107. The display device 105 may display the detected lane pattern on a display device 105. As an example, the detected lane pattern may be displayed/overlaid on the input image i.e. RGB image as shown in FIG. 2C(1). In a further example, the lane pattern may be indicated in words on the corresponding lane in the input image as shown in FIG. 2C(2). Further, the display device 105 may also display ego lanes overlaid on the input image as shown in FIG. 2C(3), which may act as a reference for the co-efficient determining module 225 to determine co-efficient values of the ego lanes.

Further, the trained semantic segmentation model 224 may classify the one or more detected lane markings based on the detected lane pattern and lane colour of the one or more lane markings. In some embodiments, the image segmenting module 223 may classify each of the one or more lane markings into one among the plurality of classes. In some embodiments, each class in the plurality of classes may be a unique combination of the lane colour and lane patterns. Exemplary classes of one or more lane markings may include, but not limited to, the plurality of classes as listed in the below Table 1.

TABLE 1

| LABEL NUMBER | CLASS DESCRIPTION |
| --- | --- |
| 1 | White dotted lane |
| 2 | White solid lane |
| 3 | White dotted dotted lane |
| 4 | White solid dotted lane |
| 5 | White dotted solid lane |
| 6 | White dotted solid dotted lane |
| 7 | Yellow dotted lane |
| 8 | Yellow solid lane |
| 9 | Yellow solid dotted lane |
| 10 | Yellow dotted solid lane |
| 11 | Yellow solid solid lane |
| 12 | Yellow dotted dotted lane |
| 13 | Blue dotted lane |
| 14 | Blue solid lane |
| 15 | White solid Blue solid lane |
| 16 | Blue dotted dotted lane |
| 17 | Blue dotted solid dotted lane |
| 18 | White dotted blue dotted lane |
| 19 | Special white dotted generated lane |
| 20 | Special white dotted solid generated lane |
| 21 | Road display stage 1 |
| 22 | Road display stage 2 |
| 23 | Road display stage 3 |
| 24 | Road crosswalk |
| 25 | Road Slow Display |
| 26 | Straight Arrow |
| 27 | Left Arrow |
| 28 | Right Arrow |
| 29 | Straight and left Arrow |
| 30 | Straight and right Arrow |
| 31 | Split Arrow left and right |
| 32 | Split Arrow straight, left and right |
| 33 | U-turn left |
| 34 | U-turn right |

In some embodiments, the segmented image, the one or more detected lane markings and the classification of the one or more detected lane markings may be stored as the lane classification data 209. Further, each of the one or more lane markings may be associated with a priority value based on the corresponding lane pattern and the lane colour. In some embodiments, the priority value may indicate relative priority of each of the one or more lane markings. As an example, consider two different lane markings are detected on the road and consider the lane patterns of the detected lane markings are dashed lane and a solid lane. Dashed lane may be generally at the centre of the road where as the solid lane may be at boundaries of the road. In such scenarios, the solid lane may be given a higher priority than the dashed lane, since the host vehicle 101 may come back into the ego lane, even when the host vehicle 101 crosses the dashed lane, however, if the host vehicle 101 crosses the solid lane, the host vehicle 101 may encounter the risk of crashing the pedestrian path.

Further, in some embodiments, upon segmenting the input image into a plurality of segments, the image segmenting module 223 may generate a binary image corresponding to the input image based on the plurality of segments. In some embodiments, the binary image may include, but not limited to, the one or more lane markings of ego lanes of the host vehicle 101. In some embodiments, the lane markings of ego lanes are extracted from the one or more lane markings detected in the segmented image. In some other embodiments, the binary image may also include lane markings such as U-turn marking, straight arrow marking and the like, which are present within the ego lanes of the host vehicle 101. FIG. 2D(1) shows an exemplary binary image indicating only the ego lanes and FIG. 2D(2) shows an exemplary binary image indicating the ego lanes and straight arrows present within the ego lanes. The binary image thus generated may be stored as the binary image data 211.

Further, in some embodiments, the co-efficient determining module 225 may determine co-efficient values of the ego lanes of the host vehicle 101 using a trained Convolutional Neural Network (CNN) model 226. In some embodiments, the ego lanes of the host vehicle 101 may be the lanes within which the host vehicle 101 is currently moving on road. Typically, ego lanes may include a left ego lane and a right ego lane. In some embodiments, the coefficient values of the ego lanes may indicate offset of the ego lanes from the current position of the host vehicle 101, slope of the ego lanes and curvature of the ego lanes. In some embodiments, the trained CNN model 226 may determine the co-efficient values of the ego lanes of the host vehicle 101 based on the priority value associated with the lane markings of the ego lanes and current position of the host vehicle 101. The co-efficient values of the ego lanes of the host vehicle 101 thus determined and the priority value associated with the ego lanes of the host vehicle 101 may be stored as the co-efficient data 213.

In some embodiments, the trained CNN model 226 may be a tiny four layered model as shown in the FIG. 2E. As shown the FIG. 2E, the trained CNN model 226 may include, two convolutional layers and two maxpool layers. The input given to the trained CNN model 226 may be the binary image comprising the one or more lane markings, generated upon segmentation of the input image. In some embodiments, the CNN model may be pre-trained based on Ground Truth (GT) images of the trial RGB images, that comprise the one or more lane markings, and Ground Truth information. In some embodiments, the Ground Truth information may include, but not limited to, coefficients of second degree polynomial corresponding to inner edge of the ego lanes. Upon providing the binary image as the input, the trained CNN model 226 may convert the binary image from a two-dimensional form to a one-dimensional form. Upon converting the binary image into one-dimensional form, the trained CNN model 226 may determine co-efficient values of the ego lanes of the host vehicle 101, using one-dimensional fully connected layers, based on the priority value associated with the lane markings of the ego lanes and the current position of the host vehicle 101. Therefore, the trained CNN model 226 may provide co-efficient values of the ego lanes of the host vehicle 101 as the output. In some embodiments, the trained CNN model 226 may generate a total of 6 co-efficient values as shown in the FIG. 2D, wherein 3 co-efficient values labelled as $a_l$, $b_l$ and $c_l$ denote co-efficient values of the left ego lane of the host vehicle 101 and 3 co-efficient values labelled as $a_r$, $b_r$ and $c_r$ denote co-efficient values of the right ego lane of the host vehicle 101. As an example, co-efficient label "$a_r$" may indicate offset of the right ego lane from the current position of the host vehicle 101, co-efficient label "$b_r$" may indicate slope of the right ego lane and co-efficient label "$c_r$" may indicate curvature of the right ego lane. Similarly, the co-efficient labels $a_l$, $b_l$ and $c_l$ indicate offset of the left ego lane from the current position of the host vehicle 101, slope of the left ego lane and curvature of the left ego lane respectively. In some embodiments, the current position of the host vehicle 101 may be determined based on position of the image sensor configured on the host vehicle 101.

In some embodiments, prior to computation of the lane co-efficient values, the co-efficient determining module 225 may perform a priority check based on the priority value associated with the lane markings of the ego lanes. In some embodiments, the priority check may include, but not limited to, detecting whether the lane markings of the ego lanes are associated with a high priority value. In such scenarios, the co-efficient determining module 225 may trigger the warning generating module 227 to generate a warning signal to the host vehicle 101 or user driving the host vehicle 101. As an example, consider one of the lane markings of the ego lanes is a solid lane which has high priority. Upon detecting such high priority value assigned to the lane markings of the ego lanes, the warning generating module 227 may generate the warning signal, in real-time, such that, accurate and safe decision making can be performed during scenarios such as lane shifting, moving towards one of the ego lanes, overtaking other host vehicles on the road and the like.

Consider an exemplary scenario, where the host vehicle 101 is attempting to overtake another host vehicle on the road from the left. Consider the lane pattern of the left ego lane is a solid lane and lane pattern of the right ego lane is a dashed lane. Further, consider there is a pedestrian path adjacent to the solid lane. Therefore, when the host vehicle 101 is attempting to overtake another host vehicle from the left, there is a tendency of the host vehicle 101 to cross the solid lane. In such scenarios, the warning generating module 227 may immediately generate a warning signal to the host vehicle 101 indicating presence of the pedestrian path adjacent to the solid lane on the left. Therefore, such warning signal may help the host vehicle 101 in real-time decision making to ensure safe navigation of the host vehicle 101.

However, when there are no high priority values associated with the lane markings of the ego lanes, or when there exists no intent to shift lanes or to overtake other host vehicles, which may be considered as high priority actions of the host vehicle 101, the co-efficient determining module 225 may proceed with determining the co-efficient values of the ego lanes of the host vehicle 101 based on the priority value associated with the lane markings of the ego lanes and the current position of the host vehicle 101. Further, in some embodiments, the co-efficient determining module 225 may determine the co-efficient values only when the one or more lane markings are detected by the image segmenting module 223. Therefore, when the one or more lane markings are not detected in the input image, the co-efficient determining module 225 may not be triggered. In some scenarios, roads may not have any lane markings. In such scenarios, the present disclosure does not trigger the co-efficient determining module 225, due to the absence of lane markings on the road for which the co-efficient values have to be determined.

In some embodiments, while training the CNN model, the co-efficient values computed by the CNN model may deviate from target value. The deviation of the co-efficient values from the target value may be considered as an error. In some embodiments, the error may be determined in the coefficient values of the ego lanes using predefined loss minimization techniques for optimizing the determination of coefficient values in subsequent computations. As an example, one of the predefined loss minimization techniques used for determining the error may be an Adam optimizer which initially determines the error in the determined co-efficient values and updates weights assigned in the CNN model in an iterative manner. For every iteration, the CNN model self-learns and updates the weights accordingly to achieve optimized and accurate co-efficient values which are close to or nearly close to the target value.

In some embodiments, the warning generating module 227 may generate warning signals based on the coefficient values of the ego lanes of the host vehicle 101 and the lane pattern and lane colour of each of the one or more lane markings. The warning signals help the host vehicle 101 to make or change decisions related to navigation, in real-time, which in turn ensures safe navigation of the host vehicle 101. As an example, the decisions related to navigation may be related to shifting of lanes, overtaking other vehicles, moving from one side to another side of the road within the ego lanes, distance to be maintained from the ego lanes and the like.

In some embodiments, the warning generating module 227 may be externally associated with the lane detection and classification system 107, as shown in the FIG. 2F. For instance, the exemplary Advanced-Driver Assistance System (ADAS) 229 as shown in the FIG. 2F may include the lane detection and classification system 107, a warning generating system 231 and a vehicle controlling system 233. In some embodiments, the warning generating system 231 associated with the lane detection and classification system 107 may generate warning signals to the host vehicle 101 based on the coefficient values of the ego lanes of the host vehicle 101 and the lane pattern and the lane colour of each of the one or more lane markings, received from the lane detection and classification system 107. Further, the vehicle controlling system 233 associated with the warning generating system 231 and the lane detection and classification system 107, may receive warning signals related to the host vehicle 101 from the warning generating system 231. Thereafter, the vehicle controlling system 233 may control navigation of the host vehicle 101, in real-time, based on the received warning signals. In some embodiments, controlling the host vehicle 101 may include, but not limited to, lane shifting, overtaking other vehicles, moving from one side to another side of the road within the ego lanes of the host vehicle 101 and maintaining safe distance of the host vehicle 101 from the ego lanes.

FIG. 3 shows a flowchart illustrating a method of detecting and classifying lanes in accordance with some embodiments of the present disclosure.

As illustrated in FIG. 3, the method 300 comprises one or more blocks illustrating a method of detecting and classifying lanes. The method 300 may be described in the general context of computer-executable instructions. Generally, computer-executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 109 of the lane detection and classification system 107, an input image from a data source 103. In some embodiments, the input image may be an RGB image captured by an image sensor mounted to a host vehicle 101. As an example, the image sensor may include, but not limited to, a camera. As an example, the camera used in the present disclosure may be a front looking surround view camera (also referred as fisheye camera) configured on the host vehicle 101.

At block 303, the method 300 may include segmenting, by the processor 109, the input image into plurality of segments using a trained semantic segmentation model 224. In some embodiments, the trained semantic segmentation model 224 may be based out of an image classification architecture such as shufflenet image classification architecture. Further, the semantic segmentation model may be built by concatenating the shufflenet image classification architecture with an up sampling network.

At block 305, the method 300 may include detecting, by the processor 109, one or more lane markings in the segmented image and, lane pattern and lane colour of each of the one or more lane markings. In some embodiments, each of the one or more lane markings is associated with a priority value based on the corresponding lane pattern and lane colour.

At block 307, the method 300 may include generating, by the processor 109, a binary image comprising lane markings of ego lanes of the host vehicle 101. In some embodiments, the lane markings of ego lanes are extracted from the one or more lane markings detected in the segmented image. Ego lanes my be the lanes within which the host vehicle 101 is currently moving. In some embodiments, the ego lanes may include a left ego lane and a right ego lane.

At block 309, the method 300 may include determining, by the processor 109, coefficient values of the ego lanes of the host vehicle 101 based on the priority value associated with the lane markings of the ego lanes and current position of the host vehicle 101, using a trained Convolutional Neural Network (CNN) model. In some embodiments, the coefficient values of the ego lanes may indicate offset of the ego lanes from the current position of the host vehicle 101, slope of the ego lanes and curvature of the ego lanes.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present disclosure. In some embodiments, the computer system 400 can be a lane detection and classification system 107 that is used for detecting and classifying lanes. The computer system 400 may include a central processing unit ("CPU" or "processor") 402. The processor 402 may include at least one data processor for executing program components for executing user or system-generated business processes. A user may include a person, a person using a device such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with the input devices 411 and the output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with more data sources 103 (103$_1$ up to 103$_k$) and a display device 105. The communication network 409 can be implemented as one of the different types of networks, such as intranet or Local Area Network (LAN), Closed Area Network (CAN) and such. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for detecting and classifying lanes. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present disclosure are intended to be illustrative, but not limiting, of the scope of the invention, which is set forth in the following claims.

| Referral numerals | |
|---|---|
| Reference Number | Description |
| 100 | Architecture |
| 101 | Host vehicle |
| 103 | One or more data sources |
| 105 | Display device |
| 107 | Lane detection and classification system |
| 109 | Processor |
| 111 | I/O interface |
| 113 | Memory |
| 203 | Data |
| 205 | Modules |
| 207 | Input image data |
| 209 | Lane classification data |
| 211 | Binary image data |
| 213 | Co-efficient data |
| 215 | Other data |
| 221 | Receiving module |
| 223 | Image segmenting module |
| 224 | Trained semantic segmentation model |
| 225 | Co-efficient determining module |
| 226 | Trained CNN model |
| 227 | Warning generating module |
| 229 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User interface |
| 407 | Operating system |
| 408 | Web browser |
| 409 | Communication network |
| 411 | Input devices |
| 412 | Output devices |

We claim:

1. A lane detection and classification system for detecting and classifying lane patterns, the lane detection and classification system comprising:
   an image sensor mounted to a host vehicle, to capture images of an area in front of the host vehicle;
   a processor communicatively connected to the image sensor and configured to:
   receive an input image from a data source, wherein the input image is an RGB image captured by the image sensor;
   segment the input image into plurality of segments using a trained semantic segmentation model;
   detect one or more lane markings in the segmented image and, lane pattern and lane colour of each of the one or more lane markings, wherein each of the one or more lane markings is associated with a priority value based on the corresponding lane pattern and lane colour;
   generate a binary image comprising lane markings of ego lanes of the host vehicle, wherein the lane markings of ego lanes are extracted from the one or more lane markings detected in the segmented image; and
   determine coefficient values of the ego lanes of the host vehicle based on the priority value associated with the lane markings of the ego lanes and current position of the host vehicle, using a trained Convolutional Neural Network (CNN) model.

2. The lane detection and classification system as claimed in claim 1, wherein the coefficient values of the ego lanes indicate offset of the ego lanes from the current position of the host vehicle, slope of the ego lanes and curvature of the ego lanes.

3. The lane detection and classification system as claimed in claim 1, wherein the ego lanes comprises a left ego lane and a right ego lane.

4. The lane detection and classification system as claimed in claim 1, wherein the processor is further configured to convert the binary image from a two-dimensional form to a one-dimensional form, when determining the coefficient values of the ego lanes of the host vehicle.

5. The lane detection and classification system as claimed in claim 1, wherein the processor is further configured to generate warning signals to the host vehicle based on the coefficient values of the ego lanes of the host vehicle and the lane pattern and the lane colour of each of the one or more lane markings.

6. The lane detection and classification system as claimed in claim 1, further wherein the processor is further configured to perform upscaling and downscaling operations on the input image, during segmentation, using the trained semantic segmentation model.

7. The lane detection and classification system as claimed in claim 1, wherein training the CNN model comprises determining error in determined coefficient values of ego lanes using predefined loss minimization techniques for optimizing the determination of coefficient values in subsequent computations, wherein the training is based on trial RGB images.

8. The lane detection and classification system as claimed in claim 1, wherein the processor is further configured to overlay graphical lanes on the input image based on the coefficient values of the ego lanes and the lane pattern of the ego lanes, to indicate position of the ego lanes in the input image.

9. An Advanced Driver-Assistance System (ADAS) comprising:
a lane detection and classification system;
a warning generating system; and
a vehicle controlling system;
the lane detection and classification system comprising:
an image sensor mounted to a host vehicle, to capture images of an area in front of the host vehicle;
a processor communicatively connected to the image sensor and configured to:
receive an input image from a data source, wherein the input image is an RGB image captured by the image sensor;
segment the input image into plurality of segments using a trained semantic segmentation model;
detect one or more lane markings in the segmented image and, lane pattern and lane colour of each of the one or more lane markings, wherein each of the one or more lane markings is associated with a priority value based on the corresponding lane pattern and lane colour;
generate a binary image comprising lane markings of ego lanes of the host vehicle, wherein the lane markings of ego lanes are extracted from the one or more lane markings detected in the segmented image; and
determine coefficient values of the ego lanes of the host vehicle based on the priority value associated with the lane markings of the ego lanes and current position of the host vehicle, using a trained Convolutional Neural Network (CNN) model;
the warning generating system associated with the lane detection and classification system is configured to:
generate warning signals to the host vehicle based on the coefficient values of the ego lanes of the host vehicle and the lane pattern and the lane colour of each of the one or more lane markings; and
the vehicle controlling system associated with the warning generating system and the lane detection and classification system is configured to:
receive warning signals related to the host vehicle from the warning generating system; and
control navigation of the host vehicle, in real-time, based on the received warning signals.

10. The ADAS as claimed in claim 9, wherein controlling the host vehicle comprises at least one of lane shifting, overtaking other vehicles, moving from one side to another side of the road within the ego lanes of the host vehicle and maintaining safe distance of the host vehicle from the ego lanes.

11. A method of detecting and classifying lanes, the method comprising:
receiving, by a processor communicatively connected to an image sensor mounted to a host vehicle, an input image from a data source, wherein the input image is an RGB image captured by the image sensor;
segmenting, using the processor, the input image into plurality of segments using a trained semantic segmentation model;
detecting, using the processor, one or more lane markings in the segmented image and, lane pattern and lane colour of each of the one or more lane markings, wherein each of the one or more lane markings is associated with a priority value based on the corresponding lane pattern and lane colour;
generating, using the processor, a binary image comprising lane markings of ego lanes of the host vehicle, wherein the lane markings of ego lanes are extracted from the one or more lane markings detected in the segmented image; and
determining, using the processor, coefficient values of the ego lanes of the host vehicle based on the priority value associated with the lane markings of the ego lanes and current position of the host vehicle, using a trained Convolutional Neural Network (CNN) model.

12. The method as claimed in claim 11, wherein the coefficient values of the ego lanes indicate offset of the ego lanes from the current position of the host vehicle, slope of the ego lanes and curvature of the ego lanes.

13. The method as claimed in claim 11, wherein the ego lanes comprises a left ego lane and a right ego lane.

14. The method as claimed in claim 11 further comprises converting the binary image from a two-dimensional form to a one-dimensional form, when determining the coefficient values of the ego lanes of the host vehicle.

15. The method as claimed in claim 11 further comprises generating warning signals to the host vehicle based on the coefficient values of the ego lanes of the host vehicle and the lane pattern and lane colour of each of the one or more lane markings.

16. The method as claimed in claim 11 further comprises performing upscaling and downscaling operations on the input image, during segmentation, using the trained semantic segmentation model.

17. The method as claimed in claim 11, wherein training the CNN model comprises determining an error in determined coefficient values of ego lanes using predefined loss minimization techniques for optimizing the determination of coefficient values in subsequent computations, wherein the training is based on trial RGB images.

18. The method as claimed in claim 11 further comprises overlaying graphical lanes on the input image based on the coefficient values of the ego lanes and the lane pattern of the ego lanes, to indicate position of the ego lanes in the input image.

\* \* \* \* \*